Oct. 17, 1933.   F. W. HALL ET AL   1,930,974
PROCESS OF AND APPARATUS FOR TREATING HYDROCARBON OILS
Filed Jan. 7, 1930
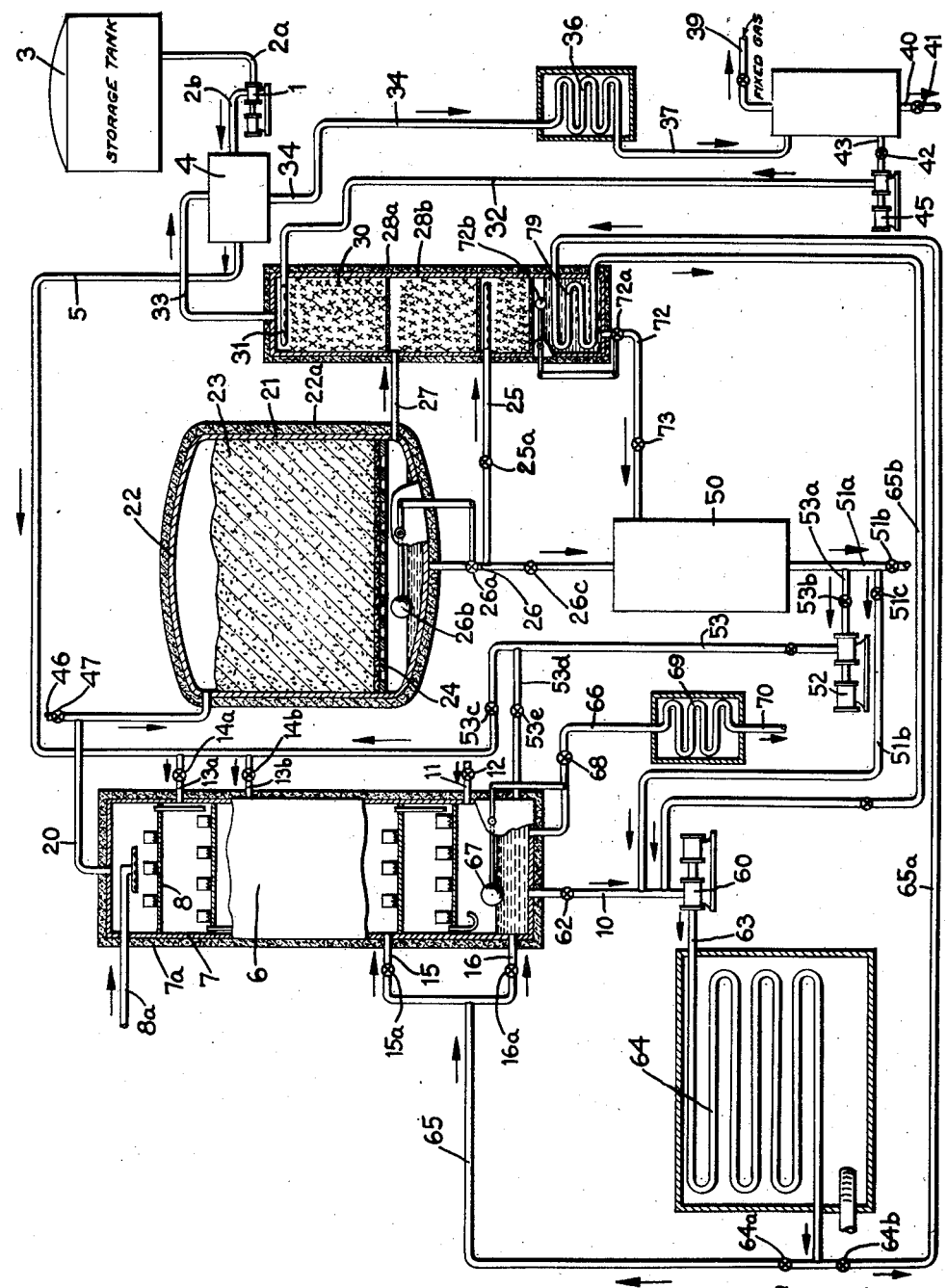

Patented Oct. 17, 1933

1,930,974

UNITED STATES PATENT OFFICE 1,930,974

PROCESS OF AND APPARATUS FOR TREATING HYDROCARBON OILS

Frank W. Hall and James H. Grahame, Port Arthur, Tex., assignors to The Texas Company, New York, N. Y., a corporation of Delaware Application January 7, 1930. Serial No. 419,015

10 Claims. (Cl. 196—96)

This invention relates to improvements in the process of and apparatus for treating hydrocarbon oils and more particularly to the treatment of relatively light hydrocarbon distillates such as cracked naphthas and the like for the production of commercial gasoline which is free from unstable and unsaturated compounds.

In its broadest aspect the invention contemplates a process of and apparatus for fractionating a hydrocarbon oil to separate out a desirable vapor fraction which is to undergo treatment and subsequently contacting the vapor fraction with catalytic material to effect polymerization of undesirable unsaturated constituents and thereafter removing the resulting polymerized compounds.

In one embodiment of the invention a stream of hydrocarbon oil to be treated which may have been previously treated with chemicals for the preliminary removal of certain impurities, preferably after having been preheated by passage in indirect contact with a relatively warm vapor enroute to condensers is delivered to a fractionator or boiler wherein all of the desirable fraction is boiled off and while in the vapor form is passed through a body or bed of comminuted solid adsorbent catalytic material, such as fuller's earth or the like, to effect polymerization of any unstable or unsaturated constituents contained in the hydrocarbon vapor. The contacted vapor fraction is then preferably passed through a packed scrubbing tower, to the top of which a proper amount of condensed finished product is returned as a reflux, while such condensate as collects in the bottom portion of the tower is either kept warm enough to therein boil off the desirable light constituents or it is returned to a hotter portion of the apparatus for that purpose.

This reflux medium serves to knock back the mechanically entrained liquid as well as the accompanying vapors of such undesirable higher boiling range components or polymers as are contained in the contacted vapors which are normally developed in the contacting or polymerizing step and which would if allowed to go overhead with the desirable vapors, result in a final product with a distillation end point higher than that of the vapors prior to contacting. These undesirable vaporous polymers which are apparently the products of catalytic reaction remain in vapor form or have been re-vaporized as a result of the evolution of heat within the contact mass due to the exothermic nature of the reaction. Due to the normal heat of the vapors and to the heat added by the reaction in the contact step there is sufficient sensible heat contained in the vapors passing through the scrubber to redistill an appreciable amount of the finished refluxed material which is returned to the top of the scrubbing tower.

Polymerized compounds, continuously deposited as a condensate in the bottom of the contacting vessel, together with a certain amount of accompanying desirable lower boiling portions, which are unintentionally condensed during passage of the total vapor through the catalytic mass, are preferably regulatably delivered to the lower portion of the scrubbing and dephlegmating tower where the lighter desirable product is ordinarily re-vaporized in order to strip out the valuable lower boiling constituents admixed with the combined polymer liquid, while the stripped polymers may be regulatably withdrawn to tankage. Heat for this re-vaporization may be supplied by any suitable means such as through a closed heating coil located in the bottom of the tower or by admitting superheated steam.

If preferable the polymers which collect in the bottom of the contacting vessel together with those knocked back from the contacted vapor in the upper portion of the tower which collect in the bottom of the dephlegmator may be withdrawn and returned either directly, or after reheating, to the previously mentioned fractionator or boiler wherein re-vaporization of the lighter constituents may be brought about along with the vaporization of the desirable fresh charge. In this case the polymerized compounds, being of higher boiling range than the vapor fraction removed from the fractionator, remain in liquid form after being returned to the fractionator and flow downwardly through the series of trays or packing material along with other higher boiling constituents, initially present in the charge oil, counter-current to the vaporous fractions rising therethrough and collect in a body in the lower portion of the fractionator.

The higher boiling liquid fraction, which is being continuously deposited in the bottom of the fractionator is regulatably withdrawn in order to constantly maintain a more or less constant body of such liquid therein, which is kept in a boiling state by passing a portion of this same liquid through an external heating coil and immediately returning it to the body from which it is drawn, or to a nearby point in the fractionator, in order to furnish a required amount of heat for vaporizing the lighter constituents of the fresh charge oil which is being delivered to the tower and also for reboiling the refluxing liquid on succeeding trays within the fractionator so that the high boiling liquid collecting in the bottom thereof will be free from any constituents boiling within the distillation range of the desired vapor fraction.

Steam is preferably admitted near the bottom of the fractionator to facilitate the vaporization of the desired light constituents and to accordingly effect the desired degree of fractionation at a lower temperature than would be required if not using steam. The steam is removed from the top of the fractionator in company with the hydrocarbon vapor and the vapor mixture is passed through the contact mass where excessive polymerization is avoided due both to the relatively low temperature of the entering vapor and to the diluent effect of the steam, while the catalytic agent is also maintained in a highly active state due to the continuous scrubbing or washing effect of the steam upon the agent.

The invention may be clearly understood from the following detailed description which has reference to the accompanying drawing illustrating diagrammatically a preferred embodiment of apparatus adapted to practice the invention.

A pump 1 withdraws naphtha distillate to be treated from a tank 3 through a pipe 2a and delivers it through pipe 2b into a heat interchanger 4 preferably of the shell and tube type, wherein it is passed in indirect heat exchange with a treated vaporized fraction being discharged from the system. The naphtha charge which is thereby preheated is then delivered through a pipe 5 to a fractionator 6 through either of several branch pipes 13a, 13b, etc. having valves 14a, 14b, etc. Ordinarily it may be preferable to introduce the charge to the top or upper section of the fractionator through the branch pipe 13a.

The fractionator 6 comprises a vertical cylindrical shell 7, the exterior of which is preferably insulated with suitable heat insulating material 7a, and a series of bubble trays 8 of conventional design arranged within the shell, although any suitable packing material such as stones, tile etc. may be employed, a vapor outlet 20 is provided at the top while suitable liquid outlets 10 and 66 are provided at the bottom of the shell. Charge inlet connections 13a, 13b, etc. are provided for delivering the charge to one or more of the trays 8 or nests of packing material located within the fractionator. Pipe connections 15 and 16 having valves 15a and 16a, respectively, are provided near the bottom of the shell 7 through which a portion of the liquid withdrawn from the bottom of the fractionator through the pipe 10 for heating may be returned.

That portion of the preheated naphtha charge which does not immediately flash into a vapor upon being discharged on the trays of the fractionator 6 merges with reflux condensate which is formed in the fractionator and collected on the trays 8, and with it overflows from tray to tray gradually moving into zones of increased temperature whereby all of the lighter constituents are progressively boiled off and that portion which is finally free from volatile constituents is ultimately deposited in a body at the bottom of the fractionator 6. Simultaneously vapor, evolved by the boiling action in the bottom of the fractionator and on succeeding trays moving upwardly in the fractionator, is caused to rise through succeeding trays bubbling through pools of reflux condensate collecting thereon to finally emerge at the top of the fractionator.

Thus to supply the necessary heat to the fractionator 6 to maintain therein the above described conditions of boiling or distillation a portion of the higher boiling liquid collecting in the bottom of the fractionator 6 is removed by a pump 60 through a pipe 10, having a valve 62, and continuously circulated through a pipe 63 and a heating coil 64, which may be of a continuous tube type of pipe still heater, from which, after being raised to the appropriate temperature, it is returned through a pipe 65 having a valve 64a to the lower portion of the fractionator 6 either through the inlet pipe 16 and valve 16a or through an alternative inlet pipe 15 and valve 15a or through both inlets simultaneously if desired. Since the circulating liquid will ordinarily be free from any of the desired volatile fractions it is therefore usually preferable to return the heated liquid through the pipe 16 directly to the body of liquid in the bottom of the fractionator.

Thus the oil circulating through the coil 64 may contain no constituents whatever boiling below a temperature corresponding to the end point of the vapor fraction leaving the top of the fractionator and there may even be a gap of at least several degrees fahrenheit between the initial boiling point of the circulating oil and the end boiling point of the vapor fraction leaving the top of the fractionator 6.

Any desired temperature can be maintained at the bottom of the fractionator 6 by either varying the quantity of oil cycled through the heating coil 64 or by circulating a definite quantity and varying the temperature to which it is heated in the coil 64.

The higher boiling oil collecting in the bottom of fractionator 6 in excess of that portion being circulated through the heating coil 64 may be removed from the system through a pipe 66 having a valve 68 to a cooling coil 69, and from thence delivered through a line 70 to a suitable storage tank not shown.

The valve 68 is preferably controlled by a float 67 within the bottom of the fractionator 6 or by other adequate means in order to constantly maintain a suitable quantity of the higher boiling liquid in the bottom of the fractionator.

The vaporous constituents separated from the charge within the fractionator 6 upon emerging therefrom are conducted through the vapor line 20 to the top of a contacting vessel 21 within which a mass or bed of finely divided catalytic material 23 is supported by means of a perforated plate or fine mesh screen resting upon a suitable grating 24. The vapor is passed downwards through the bed of catalytic material whereupon, due to the close physical contact effected between the vapor and the surface of the solid particles during passage therethrough, a catalytic reaction occurs whereby polymerization of the undesirable unsaturated and unstable constituents of the vapor is brought about.

Since the polymerization reaction is of an exothermic nature the heat which is evolved during contacting and imparted as sensible heat to the vapors passing through the contact mass, more particularly during the early life of the catalyst, may also serve to maintain a small quantity of the lighter polymerized compounds being formed in the contact mass in vapor form. These lighter compounds are sufficiently higher in boiling point than the vapor prior to contacting to cause the end point of the contacted vapor to be materially higher than it was before contacting, thereby necessitating the subjection of the contacted vapors to dephlegmation or partial condensation to produce a final product free from the light polymers and having the desired end point as will presently be described.

The polymerized compounds being formed, and which are for most part liquid under the conditions of the treatment descend through the contact mass in liquid form in company with the vaporous fractions and upon issuing from the bed of catalytic material are largely precipitated to the bottom of the vessel 21 which acts as a reservoir while the contacted vapor with accompanying vaporous, as well as any mechanically entrained polymer material, is passed out through a vapor outlet line 27 and into a dephlegmating and scrubbing tower 28.

The polymerized compounds which are deposited in the bottom of the vessel 21 frequently, though unintentionally, carry down with them a considerable proportion of the desirable lighter constituents which have become dissolved in the heavier polymerized compounds as they form, and which also to a slight extent may have been condensed from the vapor adjacent the shell 22 of the contact vessel 21 while being contacted due to cooling by the atmosphere. In order to minimize the amount of condensation of the light constituents the outer surface of the shell 22 is preferably covered with a suitable insulating material 22a.

The tower 28 preferably comprises a vertical shell 28b, the exterior of which is insulated with suitable insulating material 28a, and suitable packing material 30, preferably rasching rings or bubble trays. A spray or spider 31 is provided through which a condensed stream of contacted or finished product may be returned and sprayed over the top of the packing therein as a refluxing medium.

Inlet connections are provided whereby the contacted vapor is admitted through the pipe 27 to the middle portion of the tower 28 while the polymer liquid from the contacting vessel 21 may be introduced to the lower portion thereof. A coil 79 may be located in the bottom of tower 28 through which a heating medium may be passed to facilitate stripping out of the valuable light constituents of the polymer liquid.

Thus the upper portion of the tower 28 with the reflux medium may act as a dephlegmator to effect partial condensation to remove from the contacted vapors the somewhat higher boiling polymerized compounds formed particularly in the early stages of operation on a fresh charge of catalytic material and which are sufficiently volatile as explained above to remain in vapor form after the contact treatment thereby raising the end point of the contacted vapor above that prior to contacting even though resulting in a product otherwise satisfactory. It may also serve as a scrubber to bring about the removal of mechanically entrained droplets of mistlike particles of ploymerized material which tend to color the resulting product.

As the contact mass becomes conditioned or aged the rate of reaction gradually diminishes so that the quantity of more volatile polymerized material progressively decreases with the result that the end point of the contacted vapor decreases correspondingly and consequently during this period the quantity of reflux liquid supplied through the spray 31 in the tower 28 may also be correspondingly reduced and may even be dispensed with entirely when a contact mass becomes properly seasoned. In this last phase of its operation a small quantity of liquid reflux may still be used however, to maintain the exposed surface of the packing material in the upper portion of the tower in a wetted condition thereby facilitating coalescence of the particles of polymerized material thereon which have been entrained in the form of a fine mist-like suspension by the vapors issuing from the contacting vessel 21. Thus as the vapor and entrained matter rise through the wetted packing material the entrained particles are precipitated upon the surface of the packing, coalesced thereon to form appreciable quantities of liquid which flow downwardly through the packing and are deposited in the bottom of the tower 28 which is constructed so as to form a reservoir therein.

Leaving the top of the scrubbing tower 28 the vapor is conducted by means of a pipe 33 through the heat interchanger 4 where it is passed in indirect heat exchange with the fresh in-coming naphtha charge as previously mentioned, the latter being preheated thereby while the treated vapor is cooled, after which it is passed through a pipe 34 leading to a suitable condenser coil 36. After being passed through the condenser coil 36 the condensed treated material is conducted through a line 37 to an accumulator drum 38. The treated oil is then passed from the accumulator drum 38 through a pipe 40 having a valve 41 to a suitable storage tank, not shown. A pump 45 withdraws treated oil from the accumulator drum 38 through a line 43 having a valve 42 and delivers a regulated stream of this condensate through a pipe 32 to a spider 31 located in the vapor space above the packing in the scrubbing tower 28 to supply the desired amount of reflux liquid or scrubbing element thereto.

Polymerized compounds or polymers together with such condensed lighter fractions as collect in the bottom of the scrubbing tower 28 when not reboiling or revaporizing the light fraction in the bottom of the tower, may be conducted through a pipe 72 having a valve 72a, preferably controlled by a float 72b in the bottom of the tower 28, and a hand valve 73 to the accumulator drum 50 while the polymers collecting in the bottom of the contacting vessel 21 may be conducted through a pipe 26 having a valve 26a, preferably controlled by a float 26b in the bottom of the vessel 21, and a hand valve 26c, to the same accumulator drum 50.

A pump 52 may withdraw the combined polymers and lighter fraction from accumulator drum 50 through a pipe 53a having a valve 53b, and deliver the mixture through a pipe 53 to the fractionator 6 through the inlet connections 13a, 13b, etc., through which connections the charge is also delivered to the fractionator 6, or through a pipe 53d have a valve 53e. It is preferable however, that the pump 60 take suction on accumulator drum 50 through the pipe 51b, having a valve 51c and deliver the polymer mixture along with the high boiling circulating liquid, which is being withdrawn from the bottom of the fractionator 6, to the heating coil 64 from which the combined liquid mixture is returned in a heated state to the fractionating column 6.

The condensed lighter fractions which admix and collect with the polymers in the bottom of vessel 21 and in the bottom of scrubbing tower 28, unless re-vaporization is brought about in the lower portion of this tower, are largely composed of valuable stabilized fractions within the boiling range of the desired product as previously explained and by returning this admixture of polymers and condensate to the fractionator 6, either directly or after heating, the fractions of desired boiling range may be recovered while the less volatile polymers flow downwardly through the bubble trays and are deposited in the bottom of the fractionator 6 from which they may be ultimately removed through the line 66 along with other higher boiling fractions initially present as such in the charge.

Instead of returning the combined polymers to the heating coil 64 or to the fractionator 6, it may be preferable to pass the polymers collecting in the bottom of contacting vessel 21 through a pipe 25, having a valve 25a, to the lower portion of the scrubbing tower 28, wherein the desirable lighter constituents contained in this polymer liquid as well as those in the liquid being condensed in and descending from the upper portion of the scrubbing tower as a reflux condensate may be effectively stripped out by subjecting the polymers to re-boiling and distillation in the lower portion of the scrubbing tower 28.

The heat necessary for this re-distillation may be supplied to the bottom of the tower by admitting directly to a body of liquid maintained within the bottom of the scrubbing tower 28 a heated high boiling liquid which may be a portion of the liquid leaving the heating coil 64, thereby employing a method very similar to that used in supplying the heat to the fractionating column 6, but more preferably a closed coil 79 may be located in the bottom of the tower 28 through which a portion of said heated liquid from the heating coil 64 may be passed being conducted to the coil 79 through a line 65a having a valve 64b, and returned from the coil through a line 65b to the suction side of the pump 60.

The polymers, substantially free from the desirable low boiling fractions, may be withdrawn from the bottom of the scrubbing tower 28, through a pipe 72 having a valve 73, to the accumulator drum 50 from which they may be drawn off to a suitable storage tank not shown.

Referring to the method of operating the fractionator 6 previously described, while it is possible to effectively separate all fractions boiling within a desired temperature range from the oil charged to the fractionator without the use of steam or other inert gas to facilitate vaporization, it is advantageous to employ a certain amount of steam in order to carry on the fractionation at a lower temperature as well as to better control the subsequent catalytic action during passage of the vaporous fraction together with the steam through the activated solid material. The lower temperature of the vapor as it passes through the bed of catalytic material tends to retard the rate of reaction thereby avoiding excessive polymerization with the consequent loss of otherwise valuable treated product in the form of polymers. The steam may also operate to maintain the catalyst in a state of activation as a result of the continuous cleansing of the solid particles by the solvent or washing action of the steam, thereby avoiding frequent shut-downs to steam out or revivify the catalyst, with the result that the operating time is greatly increased.

Live steam may be admitted in a regulated stream through a pipe 11 and a valve 12 to the bottom of the fractionator 6. The steam intermingling with the oil vapor rises through the trays and in doing so is caused to bubble through the liquid collecting on the trays thereby aiding in the vaporization of the more volatile constituents from the liquid fractions moving downwardly to the bottom of the fractionator 6 and accomplishing the desired separation at lower temperatures than would be the case were no steam used. Upon reaching the top of the fractionator 6 the steam is passed out through the pipe 20 and into the vessel 21 along with the vaporous oil fraction and is conducted through the remainder of the system and finally condensed along with the oil vapor in the condenser coil 36 after which proper segregation is easily effected.

In another mode of operation the steam may be admitted directly to the contacting vessel 21 through a pipe 46 and a valve 47, thus by-passing the fractionator 6. However, as has been explained, it is preferable to admit the steam to the bottom of the fractionator 6 to thereby take advantage of the beneficial results which have been outlined.

While no particular operating pressure has been discussed herein it is contemplated that the process may be successfully practiced under either sub-atmospheric or super-atmospheric pressure. It is pointed out that in the general mode substantially atmospheric pressure or just slightly above is employed.

A further feature of the invention is its flexibility in operation wherein the charge oil may be delivered to the fractionator either in a cold or a preheated condition or also in either a liquid or vapor state. When the charge is introduced to the fractionator in a vapor state it is preferable to supply adequate cooling to the top of the fractionator as by supplying a portion of finished or unfinished distillate thereto through an inlet 8a, whereby, through the ensuing refluxing action of the coolant, the proper conditions of fractionation will be maintained within the fractionator.

Obviously many modifications and variations of the invention, as herein set forth, may be made without departing from the spirit and scope thereof, and therefore, only such limitations should be imposed as are indicated in the appended claims.

What we claim is:

1. The method of treating hydrocarbon oils, which comprises bringing oil in vapor form into contact with adsorbent catalytic material to polymerize its unstable constituents thereby forming liquid polymers wherein the end point of the vapor is incidentally increased above its end point prior to contacting, said resulting end point lowering with corresponding conditioning of the catalyst, introducing the said contacted vapor to the mid portion of a dephlegmating tower and subjecting it to dephlegmation therein to form a liquid fraction and a desirable dephlegmated vapor fraction, introducing the polymers collected during contacting of the vapor to a lower portion of said tower to combine therein with the polymer liquid fraction being formed and collecting in the lower portion thereof, subjecting the polymers to re-boiling therein to form a desirable vapor fraction and a liquid fraction free from the valuable fractions previously admixed therewith, passing this vapor fraction through the upper portion of the tower along with the incoming contacted vapor to form a final vapor fraction, removing and condensing the combined final vapor fraction, returning a portion of the distillate as a reflux to the tower and removing the said liquid fraction.

2. The process of treating hydrocarbon oils, comprising delivering a preheated charge oil to a fractionator and subjecting it to fractionation therein, removing therefrom a desirable relatively low boiling vapor fraction and a higher boiling liquid fraction, continuously removing from the bottom of the fractionator and reheating a portion of the higher boiling liquid fraction and returning it thereto in a heated state to thereby maintain a boiling body of the higher boiling liquid in the lower portion of the fractionator, contacting the lower boiling vapor fraction with solid adsorbent catalytic material to polymerize its unstable constituents, removing the liquid polymers formed during the contacting step, scrubbing the contacted vapor in the upper portion of a scrubbing tower to precipitate the mechanically entrained polymers suspended in the vapor in the form of fine mist, delivering the precipitated polymer liquid together with that removed during the contacting step into the lower portion of the scrubbing tower, re-boiling the polymer liquid delivered to the scrubbing tower to thereby strip out the valuable light material admixed therewith, passing the said light material through the upper portion of the tower as a vapor to combine with the contacted vapor being scrubbed, passing the combined scrubbed vapor in indirect heat exchange with the fresh charge oil to thereby preheat the oil, eventually condensing the vapor, returning a portion of the condensate as a reflux to the scrubbing tower and removing from the scrubbing tower the stripped polymer liquid.

3. The process of treating hydrocarbon oils comprising delivering a preheated charge oil to a fractionator, admitting steam to the bottom of the fractionator and subjecting the oil to fractionation therein, removing therefrom a desirable relatively low boiling vapor fraction and a higher boiling liquid fraction, continuously removing from the bottom of the fractionator and reheating a portion of the higher boiling liquid fraction and returning it thereto in a heated state to thereby maintain a boiling body of the higher boiling liquid in the lower portion of the fractionator, contacting the lower boiling vapor with solid adsorbent catalytic material to polymerize its unstable constituents, removing liquid polymers formed during the contacting step, scrubbing the contacted vapor to remove the mechanically entrained polymers suspended therein in the form of fine mist, passing the contacted scrubbed vapor in indirect heat exchange with the fresh charge oil to thereby preheat the oil, condensing the contacted scrubbed vapor, returning a portion of the condensate as a reflux to the scrubbing tower and returning to the fractionator the polymer compounds removed from the vapor during the contacting and the scrubbing steps.

4. The process of treating hydrocarbon oils, comprising delivering a preheated charge oil to a fractionator and subjecting it to fractionation therein, removing therefrom a desirable relatively low boiling vapor fraction and a higher boiling liquid fraction, continuously removing from the bottom of the fractionator and reheating a portion of the higher boiling liquid fraction and returning it thereto in a heated state to thereby maintain a boiling body of the higher boiling liquid in the lower portion of the fractionator, admixing steam with the oil vapor being formed, contacting the lower boiling vapor fraction in the presence of steam with solid adsorbent catalytic material to polymerize its undesirable constituents, removing liquid polymers formed during the contacting step, scrubbing the contacted vapor in the upper portion of a scrubbing tower to precipitate the mechanically entrained polymers suspended in the vapor in the form of fine mist, delivering the precipitated polymer liquid together with that removed during the contacting step into the lower portion of the scrubbing tower, re-boiling the polymer liquid delivered to the dephlegmator to thereby strip out the valuable light material entrained therewith, passing the said light material through the upper portion of the tower as a vapor to combine with the contacted vapor being scrubbed, passing the contacted scrubbed vapor and steam in indirect heat exchange with the fresh charge oil to thereby preheat the oil, condensing the vapors, returning a portion of the condensed oil as a reflux to the scrubbing tower and withdrawing from the scrubbing tower the polymer compounds removed during the contacting and scrubbing steps.

5. The process of treating hydrocarbon oil comprising delivering a preheated charge oil to a fractionator and subjecting it to fractionation therein, removing therefrom a desirable relatively low boiling vapor fraction and a higher boiling liquid fraction, continuously removing from the bottom of the fractionator and reheating a portion of the higher boiling liquid fraction and returning it thereto in a heated state to thereby maintain a boiling body of the higher boiling liquid in the lower portion of the fractionator, admixing steam with the oil vapor being formed, contacting the lower boiling vapor fraction in the presence of steam with solid adsorbent catalytic material to polymerize its unstable constituents, removing liquid polymers formed during the contacting step, dephlegmating the contacted oil vapor and subjecting it while still in the presence of steam to partial condensation in the upper portion of a dephlegmating tower to thereby form an oil vapor fraction of predetermined end point and a liquid polymer fraction, subjecting the said liquid polymer fraction together with the polymers formed during the contacting step to re-boiling in the lower part of the dephlegmating tower to thereby form a vapor fraction and a liquid fraction free from the valuable lighter fractions previously entrained therewith, passing this vapor fraction through the upper portion of the tower along with the incoming contacted vapor to form a final vapor fraction, passing the final vapor along with accompanying steam in indirect heat exchange with fresh charge oil to thereby preheat the oil, condensing the oil vapor and steam, returning a portion of the condensed oil as a reflux to the dephlegmating tower and removing the liquid fraction from the bottom of the tower.

6. An apparatus for treating hydrocarbon oils, comprising a heater coil for heating a portion of the oil which is circulated therethrough, a fractionator in communication therewith for developing a desirable vapor fraction and liquid fraction, a catalyst container communicating with the fractionator containing a catalyst through which vapor from the fractionator is passed and polymerized and in the lower portion of which condensed polymers collect, a dephlegmator in vapor communication with the catalyst container for dephlegmating the vapor from the catalyst container and in the lower portion of which condensed polymers collect, a heat interchanger through which a relatively cool charge oil and relatively hot vapor from the dephlegmator is passed in indirect heat interchange with the relatively hot vapor from the dephlegmator, means for condensing the vapor, an automatically regulated draw-off for withdrawing polymers from the lower portion of the catalyst container, an automatically regulated draw-off for withdrawing polymers from the lower portion of the dephlegmator, an accumulator for accumulating the withdrawn polymers and means for returning the withdrawn polymers to the inlet of the heater coil.

7. An apparatus for treating hydrocarbon oils, comprising a heater coil for heating a portion of the oil which is circulated therethrough, a fractionator in communication therewith for developing a desirable vapor fraction and a liquid fraction having a steam inlet and whose lower portion is adapted to contain a body of liquid, means automatically regulatable for withdrawing a surplus of liquid collecting in the lower portion of the fractionator, a catalyst container communicating with the fractionator containing a catalyst through which vapor from the fractionator is passed and polymerized and in the lower portion of which condensed polymers collect, a dephlegmator in vapor communication with the catalyst container for dephlegmating the vapor from the catalyst container and in the lower portion of which condensed polymers collect, a heat interchanger through which a relatively cool charge oil and relatively hot vapor from the dephlegmator is passed in indirect heat interchange, means for condensing the vapor, an automatically regulated draw-off for withdrawing polymers from the lower portion of the catalyst container, an automatically regulated draw-off for withdrawing polymers from the bottom of the dephlegmator, an accumulator for accumulating the withdrawn polymers and means for returning the withdrawn polymers to the fractionator.

8. An apparatus for treating hydrocarbon oils comprising a heater coil for heating a portion of the oil, which is circulated therethrough, a fractionator in communication therewith for developing a desirable vapor fraction and a liquid fraction having a steam inlet and whose lower portion is adapted to contain a body of liquid, means automatically regulatable for withdrawing a surplus of liquid collecting in the lower portion of the fractionator, a catalyst container communicating with the fractionator containing a catalyst through which vapor from the fractionator is passed and polymerized and in the lower portion of which condensed polymers collect, a dephlegmating tower in vapor and liquid communication with the catalyst contained for dephlegmating vapors from the catalyst container and for reboiling polymer liquid formed during the contacting step and during the dephlegmating step to thereby strip out valuable lighter constituents which become admixed therewith, means for supplying heat to the lower portion of the dephlegmator, a heat interchanger through which a relatively cool charge oil and relatively hot vapor from the dephlegmator is passed in indirect heat interchange, means for condensing the vapor, means for refluxing condensate to the dephlegmating tower and an automatically regulated draw-off for withdrawing stripped polymers from the lower portion of the dephlegmating tower.

9. The process of manufacturing a superior grade of merchantable motor fuel from cracked naphtha distillate containing hydrocarbon constituents of higher boiling range than the desired final product comprising subjecting the naphtha while in liquid phase to preliminary chemical treatment, introducing the preliminarily treated naphtha to a fractionating zone to produce a gasoline vapor fraction substantially free from freshly-formed products of decomposition and undesired high-boiling constituents, continuously removing from the fractionating zone a stream of hydrocarbons composed substantially entirely of constituents boiling above the range of said gasoline vapor fraction, heating said stream under non-cracking conditions in an external heating zone, returning to the fractionating zone, to supply heat of vaporization for the preliminarily treated naphtha introduced thereto, the thus heated stream substantially free from decomposition products which would contaminate the gasoline vapor fraction being formed, removing the gasoline vapor fraction so formed, withdrawing the excess high-boiling liquid accumulating in the fractionating zone, subjecting the gasoline vapor fraction to direct contact with a solid adsorbent catalytic material to polymerize its unstable constituents, separating the resulting liquefied polymers, and fractionating the contacted vapor to remove vaporous and entrained polymerized material and produce a purified, stable fraction comprising the final motor fuel product of desired boiling range.

10. In the manufacture of a superior grade of merchantable motor fuel from cracked naphtha containing constituents of higher boiling range than the desired final product and which has been subjected to preliminary chemical treatment while in liquid phase, the method of forming therefrom a gasoline vapor fraction suitable for treatment with solid adsorbent catalytic material, comprising introducing the preliminarily treated naphtha to the upper portion of a fractionating zone, removing from the top of the fractionating zone a gasoline vapor fraction substantially entirely free from freshly-formed products of decomposition, continuously withdrawing from the bottom of the fractionating zone a stream of hydrocarbons composed substantially entirely of constituents boiling above the range of said gasoline vapor fraction, heating said stream under non-cracking conditions in an external heating zone, returning to the lower portion of the fractionating zone, to supply heat of vaporization to the preliminarily treated naphtha introduced to the fractionating zone, the thus treated stream substantially free from decomposition products which would contaminate the gasoline vapor fraction being formed, and withdrawing the excess high-boiling liquid accumulating in the bottom of the fractionating zone substantially free from gasoline constituents.

FRANK W. HALL.
JAMES H. GRAHAME.